US012571663B2

(12) United States Patent
Hegazi et al.

(10) Patent No.: US 12,571,663 B2
(45) Date of Patent: Mar. 10, 2026

(54) SENSOR UNIT AND METHOD FOR PRODUCING A SENSOR UNIT

(71) Applicant: Robert Bosch GmbH, Stuttgart (DE)

(72) Inventors: Anwar Hegazi, Erfurt (DE); Joerg Siedentopf, Untergruppenbach (DE); Robert Remus, Mundelsheim (DE); Peter Huendorf, Eisenach (DE); Thomas Breinlinger, Isny (DE); Bernd Lutz, Kempten (DE); Heiko Rausch, Gotha (DE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 18/548,672

(22) PCT Filed: Mar. 30, 2022

(86) PCT No.: PCT/EP2022/058398
§ 371 (c)(1),
(2) Date: Sep. 1, 2023

(87) PCT Pub. No.: WO2022/214374
PCT Pub. Date: Oct. 13, 2022

(65) Prior Publication Data
US 2024/0151561 A1     May 9, 2024

(30) Foreign Application Priority Data
Apr. 7, 2021     (DE) ..................... 10 2021 108 660.4

(51) Int. Cl.
*G01P 3/42*          (2006.01)
*G01D 11/24*         (2006.01)
(Continued)

(52) U.S. Cl.
CPC ........... *G01D 11/245* (2013.01); *G01D 11/30* (2013.01); *G01P 1/026* (2013.01)

(58) Field of Classification Search
CPC ......... G01D 11/30; G01D 11/245; G01P 1/02; G01P 1/026; G01P 3/50; G01P 3/52; G01P 3/54; B29C 45/14639
See application file for complete search history.

(56) References Cited

U.S. PATENT DOCUMENTS

| | | | |
|---|---|---|---|
| 6,034,421 A | 3/2000 | Tokunaga | |
| 11,584,053 B2 * | 2/2023 | Kim | ........................ B29C 45/14 |

(Continued)

FOREIGN PATENT DOCUMENTS

| | | |
|---|---|---|
| DE | 102 22 204 A1 | 11/2003 |
| DE | 10 2005 012 709 A1 | 9/2006 |

(Continued)

OTHER PUBLICATIONS

International Search Report corresponding to PCT Application No. PCT/EP2022/058398, mailed Jul. 15, 2022 (German and English language document) (6 pages).

(Continued)

*Primary Examiner* — Thang X Le

(74) *Attorney, Agent, or Firm* — Maginot, Moore & Beck LLP

(57) ABSTRACT

A sensor unit includes at least one sensor and at least two busbars. The busbars have first ends forming an internal electric interface for contacting the sensor and second ends forming an external electric interface for a connection cable or a plug receiving area. An injection-molded plastic housing defines the outer shape of the sensor unit and forms a sensor receiving area with a through-opening, which holds the sensor. The housing partly encases the busbars such that the internal electric interface is at least partly free and accessible near the sensor receiving area and the external electric interface is formed within the housing. The sensor and the internal electric interface are surrounded by a potting compound in a media-tight manner to form a sealed sensor (Continued)

head. The potting compound is formed of a material that can be processed at lower pressures and/or temperatures than the plastic material of the housing.

15 Claims, 6 Drawing Sheets

(51) Int. Cl.
  *G01D 11/30* (2006.01)
  *G01P 1/02* (2006.01)

(56) References Cited

U.S. PATENT DOCUMENTS

| | | | |
|---|---|---|---|
| 2002/0196014 A1* | 12/2002 | Iwase | G01D 11/245 |
| | | | 324/207.2 |
| 2012/0306484 A1* | 12/2012 | Mizutani | G01D 11/245 |
| | | | 264/255 |
| 2017/0176223 A1* | 6/2017 | Steinbrink | G01D 11/245 |

| | | | |
|---|---|---|---|
| 2018/0348022 A1* | 12/2018 | Ushiro | F16B 9/02 |
| 2019/0120669 A1 | 4/2019 | Pusheck et al. | |
| 2019/0212385 A1* | 7/2019 | Contet | G01D 11/245 |

FOREIGN PATENT DOCUMENTS

| | | | |
|---|---|---|---|
| DE | 10 2009 028 963 A1 | | 3/2011 |
| DE | 10 2017 222 681 A1 | | 6/2019 |
| DE | 102017222681 | * | 6/2019 |
| JP | 2009-74993 A | | 4/2009 |

OTHER PUBLICATIONS

"Introduction of PBT General Engineering Plastics in the Injection Molding Industry", Injection Molding Services, Sep. 9, 2019, Odin Mould Co., Ltd., http://no.injectmould.com/info/introduction-of-pbt-general-engineering-plasti-39705967.html (8 pages).

"LIMS Liquid Injection Molding System", May 2008, Shin-Etsu Chemical Co (14 pages).

* cited by examiner

SENSOR UNIT AND METHOD FOR PRODUCING A SENSOR UNIT

This application is a 35 U.S.C. § 371 National Stage Application of PCT/EP2022/058398, filed on Mar. 30, 2022, which claims the benefit of priority to Serial No. DE 10 2021 108 660.4, filed on Apr. 7, 2021 in Germany, the disclosures of which are incorporated herein by reference in their entirety.

The invention disclosure relates to a sensor unit and methods for producing such a sensor unit. For example, the sensor unit can be used as a speed sensor for a vehicle wheel or for a rotatable shaft in the vehicle.

BACKGROUND

A mount for a sensor unit and a method for producing a sensor unit are known from DE 102 22 204 A1. In a first work step, a sensor element and an electronic evaluation unit are electrically and mechanically fastened by means of welding, soldering, crimping or gluing to busbars, which are connected to each other via connecting bars. In a second work step, the busbars with the elements held thereon are introduced into an injection molding tool and insert-molded with plastic in a first injection molding process. In a third work step, the connecting bars are removed. In a fourth work step, respectively one electric lead or also plug contacts are connected by welding, soldering, crimping or gluing to the ends of the busbars projecting out of the housing and form an external connection. In a final work step, the so-called final insert-molding process, the final outer geometry of the sensor unit is produced; at the same time, the inner electronic components are protected from environmental influences such as moisture.

A magnetic field sensor, in particular a speed and/or rotational direction sensor for a vehicle wheel or for the drive train of a vehicle, is known from DE 10 2005 012 709 A1. The magnetic field sensor as a whole is insert-molded with a sheath made of a thermoplastic plastic. Inside, there is a mount that is also injection-molded from a thermoplastic plastic and comprises fusing ribs for securely integrating the mount into the sheath. The same polyamide material is used as a thermoplastic plastic for both the sheath and the mount. Two wires of a connection cable are injection-molded into a terminal-side end of the mount, and the stripped ends of said wires are respectively connected to busbars by means of a crimp connection. These busbars are first made in one piece to facilitate the positioning of the electric connecting components, and are then electrically insulated from each other by separating the connecting parts. The free ends of the busbars are connected to connection leads of an IC sensor element in the region of a window-like opening in the mount by means of welding or soldering. The mount furthermore comprises a pocket-like recess in the region of its reader-side front face in which the sensor element is inserted and, during the final insert-molding with plastic, is supported at least in the direction of the injection pressure and is thus protected against mechanical damage.

SUMMARY

The sensor unit with the features disclosed herein and the methods for producing a sensor unit with the features disclosed herein each have the advantage that the actual sealing function is decoupled from the design variance of the housing. This results in a functional division between the seal and the housing shape so that the sealing process in the second injection molding process can be optimized separately from the shaping of the housing. In addition, the housing shape can be adapted to different applications and installation situations independently of the seal. Furthermore, the known sealing rib geometries and the mounts used in the prior art can be omitted. For example, the connection between the potting compound and the housing can be based on the exploitation of adhesion, bipolar forces or covalent bonds, or on a combination of said effects.

Embodiments of the present disclosure provide a sensor unit comprising at least one sensor and at least two busbars. An internal electric interface for contacting the at least one sensor is provided on first ends of the at least two busbars, and an external electric interface for a connection cable or a plug receiving area is formed on second ends of the at least two busbars. An injection-molded housing made of a plastic material specifies an outer shape of the sensor unit and forms a sensor receiving area with a through-opening. The housing partly encases the at least two busbars such that the internal electric interface in the region of the sensor receiving area is at least partly free and accessible, and the external electric interface for the connection cable or the plug receiving area is formed within the housing. The at least one sensor is held by the sensor receiving area and contacted with the internal electric interface, wherein the internal electric interface and the at least one positioned and contacted sensor are surrounded by a potting compound in a media-tight manner and form a sensor head which is sealed off from the housing. The potting compound of the sensor head consists of a material which can be processed at lower pressures and/or temperatures than the plastic material of the housing.

In addition, a method for producing a sensor unit is proposed. The method comprises the following steps: providing at least two busbars which are connected to each other via at least one connecting bar; connecting wires of a connection cable or contact elements of a plug receiving area to second ends of the at least two busbars which form an external interface; introducing the busbars with the connection cable or contact elements of the plug receiving area into a cavity of a first injection molding tool which specifies a shape of a housing with a sensor receiving area for at least one sensor; performing a first injection molding process with a plastic material and curing the injection-molded housing; inserting and positioning the at least one sensor into the sensor receiving area of the housing and contacting the at least one sensor with an internal electric interface of the at least two busbars; introducing the housing into a second injection molding tool and performing a second injection molding process with a potting compound in such a way that the potting compound in the cured state surrounds the internal electric interface and the at least one positioned and contacted sensor in a media-tight manner and forms a sensor head which is sealed off from the housing. In this case, the potting compound of the sensor head consists of a material that is introduced into the corresponding second injection molding tool at lower pressures and/or temperatures than the plastic material of the housing.

Furthermore, a method for producing a sensor unit with a plug receiving area is proposed. The method comprises the steps of: providing at least two busbars which are connected to each other via at least one connecting bar and whose second ends form an external interface and contact elements of the plug receiving area; introducing the busbars into a cavity of a first injection molding tool which specifies a shape of a housing with the plug receiving area and a sensor receiving area for at least one sensor; performing a first injection molding process with a plastic material and curing the injection-molded housing; inserting and positioning the at least one sensor into the sensor receiving area and contacting the at least one sensor with an internal electric interface of the at least two busbars; introducing the housing into a second injection molding tool and performing a second injection molding process in such a way that the potting compound in the cured state surrounds the internal electric interface and the at least one positioned and contacted sensor in a media-tight manner and forms a sensor head which is sealed off from the housing. In this case, the potting compound of the sensor head consists of a material that is introduced into the corresponding injection molding tool at lower pressures and/or temperatures than the plastic material of the housing.

Embodiments of the disclosure allow for modular manufacturing of the sensor unit according to the disclosure. For example, the housing can be manufactured with a connection area and a sensor receiving area as a supplier part in various embodiments. Equipping the housing with the at least one sensor and performing the final second injection molding process to seal the sensor and an internal interface can then be standardized for the various embodiments of the housing. By standardizing the equipping process and the second injection molding process, variance, design diversity or design variants can be reduced. In addition, sensors of different shapes and dimensions can be implemented in a basic sensor design by changing a molding insert when manufacturing the housing. For example, a modular tool design can be implemented with standard inserts for different sensors, reducing tool costs for positioning different sensors. By inserting and contacting the sensor after the first injection molding process of the housing, mounts or special holding tools for the sensor during the second injection molding process can be omitted. In addition, the seal implemented in the second injection molding process only requires a one-time leak test after the second injection molding process. In addition, the standardized second injection molding process and the standardized sealing concept achieved thereby allow the use of a shared production line for wired or directly connected embodiments of the sensor unit. The potting compound introduced into the corresponding second injection molding tool at lower pressures and/or temperatures than the plastic material of the housing can advantageously prevent excessive mechanical and/or thermal stresses on the at least one sensor during the second injection molding process.

In the present case, a sensor unit is understood to be a component unit comprising at least one sensor, which directly or indirectly senses a physical quantity or a change in a physical quantity and preferably converts it into an electric sensor signal. This can take place, for example, by emitting and/or receiving sound waves and/or electromagnetic waves, and/or via a magnetic field or the change in a magnetic field. For example, the at least one sensor can react to an alternating magnetic field and then convert these magnetic field changes directly into an electric signal, and comprise a Hall effect sensor element, magnetoresistive sensor element or inductive sensor element, which registers the change in a magnetic field, for example via the voltage generated by magnetic induction. Embodiments of the sensor unit according to the present disclosure can be used, for example, to measure speeds and/or rotational directions in the vehicle. Depending on the application, the sensor unit can be used as a speed sensor on the wheels for an anti-lock braking system (ABS), as a speed and phase encoder for an engine controller, or as a steering angle sensor for so-called vehicle dynamics control systems and electric steering aids.

The sensor is typically constructed as an integrated electronic circuit (IC) with at least one integrated sensor element and can also be referred to as a sensor chip. For example, these magnetic field changes can be generated by an impulse wheel or linear element that moves in relation to the at least one sensor. As a result, the at least one sensor can generate therefrom an electric signal for determining a path that is traveled in relation to the sensor, a speed, an acceleration, an acceleration gradient, and/or a turning angle.

Advantageous improvements of the sensor unit and the methods specified above are enabled by the following measures and developments.

In an advantageous embodiment of the sensor unit, the sensor receiving area can comprise a receiving tray which is molded onto the housing and into which the through-opening is introduced in the region of the internal electric interface. In this case, the potting compound can form a filling, which fills the receiving tray, which is molded onto the housing, and the through-opening in a media-tight manner and encases the at least one sensor, which is introduced into the receiving tray, and the internal electric interface. This enables a particularly simple design of the second injection molding tool since only the edge of the receiving tray and of the through-opening is covered for filling the receiving tray and the through-opening with the potting compound.

It is particularly advantageous that the sensor receiving area can comprise a retaining bar which is molded onto the housing and into which the through-opening is introduced in the region of the internal electric interface. In this case, the potting compound can form a sheath which fills the through-opening and encases the retaining bar molded onto the housing, the at least one sensor arranged on the retaining bar, and the internal electric interface in a media-tight manner. The design of the sensor receiving area as a retaining bar allows for a particularly thin sheath and thus a particularly flat design of the sensor head. In addition, the retaining bar facilitates contacting of the at least one sensor.

In another advantageous embodiment of the sensor unit, first contact means designed as contact surfaces can be formed on the first ends of the at least two busbars. As a result, terminal contacts of the at least one sensor can be electrically contacted simply by soldering or resistance welding to the contact surfaces.

In another advantageous embodiment of the sensor unit, second contact means designed as contact surfaces or as crimp sleeves or as contact strips, or as plug contacts can be arranged on the second ends of the at least two busbars. In the design of the second ends as contact surfaces, the stripped ends of the wires of the connection cable or the contact elements of the plug receiving area can be simply electrically contacted by soldering or resistance welding to the at least two busbars. In the design of the second ends as crimp sleeves, the stripped ends of the wires of the connection cable or the contact elements of the plug receiving area can be electrically contacted by crimp connections with the at least two busbars. In the design of the second ends as contact strips, the stripped ends of the wires of the at least one connection cable or the contact elements of the plug receiving area can be electrically contacted by splice connections or crimp connections to the busbars. When the second ends are designed as plug contacts, they can be used directly as contact elements for the plug receiving area. Alternatively, the contact elements of the plug receiving area can, for example, be designed as busbars which form the plug contacts of the plug receiving area at one end and can be designed as contact strips at the other end, for example.

The contact strips of the contact elements can then be connected to the second contact means, designed as contact strips, of the at least two busbars at the external electric interface via splice connections or crimp connections.

In another advantageous embodiment of the sensor unit, a fastening device can be molded onto the housing and comprise a fastening tab or latching means. If the fastening device molded onto the housing comprises a fastening tab, the corresponding sensor unit can be screwed in at the installation location, for example a steering knuckle. If the fastening device molded onto the housing comprises latching means, the sensor unit can, for example, be inserted and latched into a receiving hole.

In another advantageous embodiment of the sensor unit, the plastic material for the housing can, for example, be a polybutylene terephthalate (PBT) or polyamide (PA). A hot melt adhesive or a thermoplastic elastomer (TPE) or a thermoplastic polyurethane (TPU) or a silicone can be used as a potting compound, for example. In order to improve the bonding capacity, reactive bonding agents can be mixed into the plastic material for the housing and/or into the material of the potting compound.

In an advantageous embodiment of the method, the at least one connecting bar between the at least two busbars can be cut prior to the second injection molding process.

In another advantageous embodiment of the methods, the potting compound can form a filling, for example, which, in the cured state, fills a receiving tray of the sensor receiving area and the through-opening, surrounds the at least one sensor and the internal electric interface in a media-tight manner, and is connected to the housing in a media-tight manner. Alternatively, the potting compound can form a sheath which, in the cured state, surrounds a retaining bar of the sensor receiving area with the at least one sensor and the internal electric interface, fills the through-opening, and is connected to the housing in a media-tight manner.

In another advantageous embodiment of the methods, at least one sealing area at contact areas of the housing can be pretreated with the potting compound prior to introduction of the housing into the second injection molding tool, in order to increase a connection between the housing, inserts, sensor and potting compound. For example, in order to improve the bonding capacity when using a hot melt adhesive as a potting compound, the at least one sealing area of the housing can be polished in order to achieve a very smoothly finished surface since this is advantageous for the connection between the hot melt adhesive and the housing. Additionally or alternatively, the housing as well as the inserts and the at least one sensor can be preheated in order to improve the connection. A rougher surface of the housing is advantageous for other potting materials, such as the above-mentioned thermoplastic elastomers (TPE), thermoplastic polyurethane (TPU), silicones TPE/TPU, or silicones. The at least one sealing area of the housing can therefore be roughened and/or specifically structured, for example by sandblasting, milling or laser structuring. The connection, based on the exploitation of adhesion, bipolar forces and/or covalent bonds, between the potting compound and the housing can thereby be improved. Additionally or alternatively, the at least one sealing area of the housing can be plasma-cleaned and/or plasma-activated, for example. By activating the surface of the at least one sealing area of the housing, the wettability and thus the bonding capacity of the at least one sealing area to the potting compound can be significantly improved. Alternatively or additionally, the at least one sealing area of the housing can be coated, for example, with an adhesion agent or primer, which can improve the adhesion properties of surfaces. In summary, by increasing the adhesive strength, the connection between the sealing area of the housing and the potting compound and thus also the resistance to water and chemicals can be increased.

DESCRIPTION OF THE DRAWINGS

Exemplary embodiments of the invention disclosure are illustrated in the drawings and explained in greater detail in the subsequent description. In the drawings, identical reference signs refer to components or elements performing identical or similar functions.

BRIEF DESCRIPTION OF THE DRAWINGS

Figure 1:
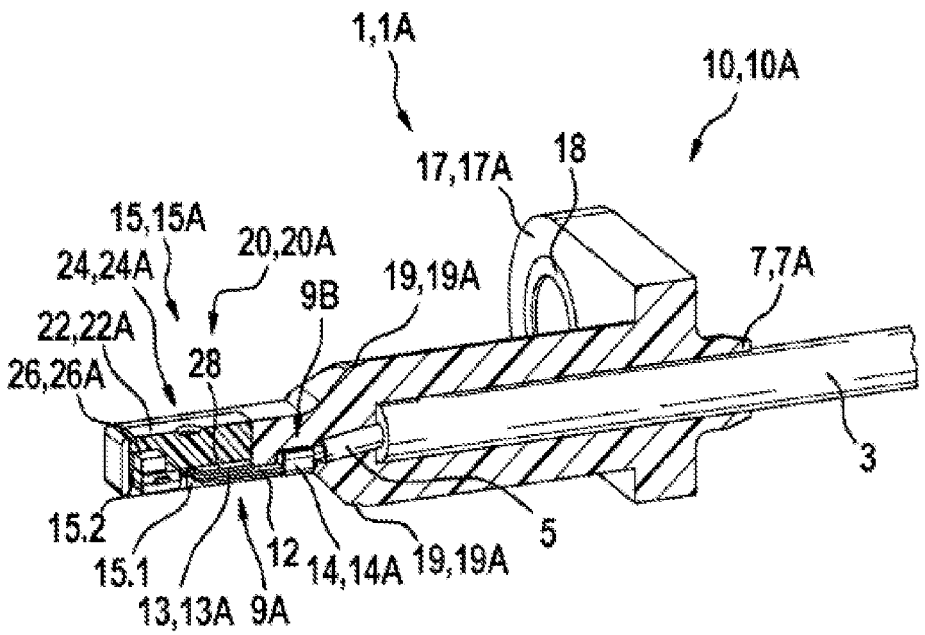

FIG. 1 shows a schematic perspective sectional view of a first exemplary embodiment of a sensor unit according to the invention disclosure.

Figure 2:
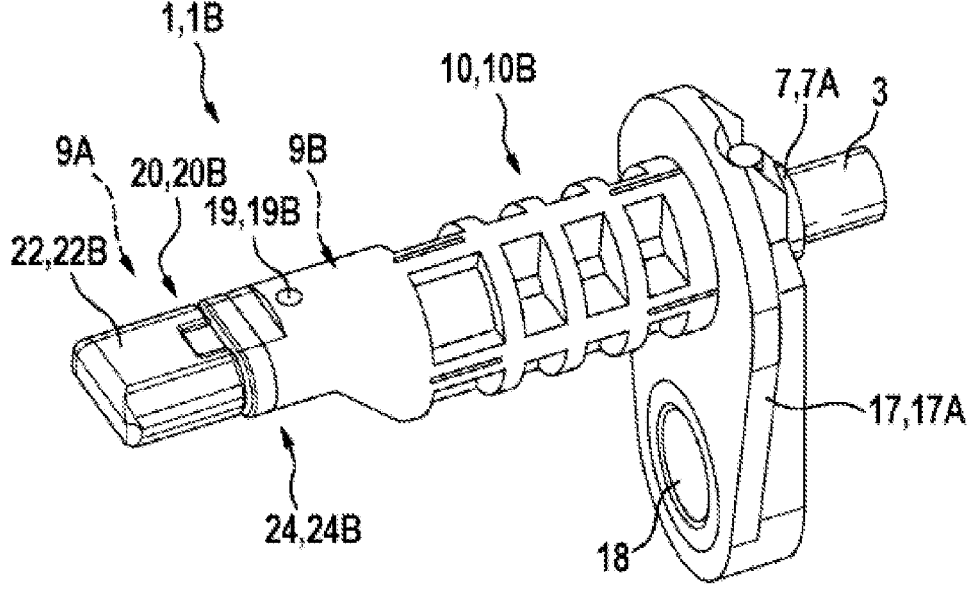

FIG. 2 shows a schematic perspective view of a second exemplary embodiment of a sensor unit according to the disclosure.

Figure 3:
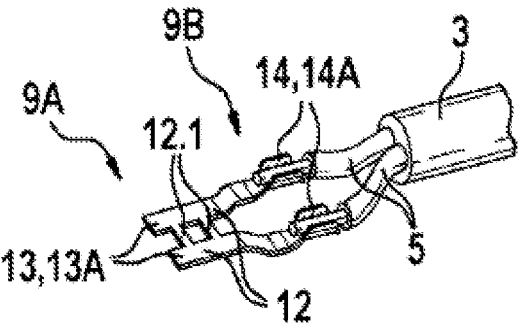

FIG. 3 shows a schematic view of busbars with an internal and an external interface for the sensor unit according to the disclosure of FIG. 2.

Figure 4:
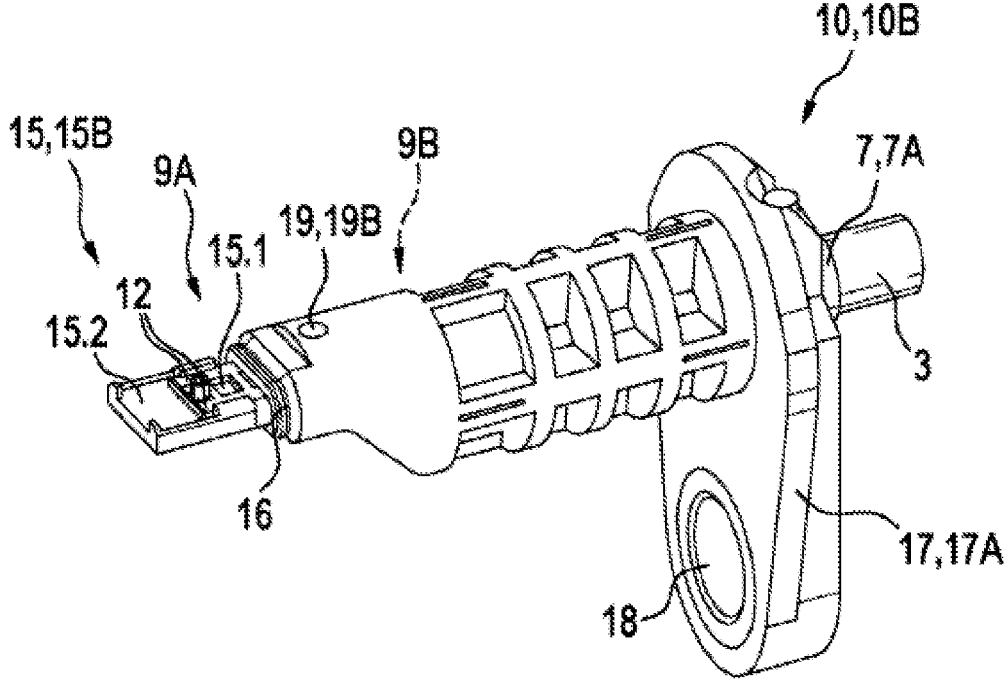

FIG. 4 shows a schematic perspective view of a housing of the sensor unit according to the disclosure of FIG. 2.

Figure 5:
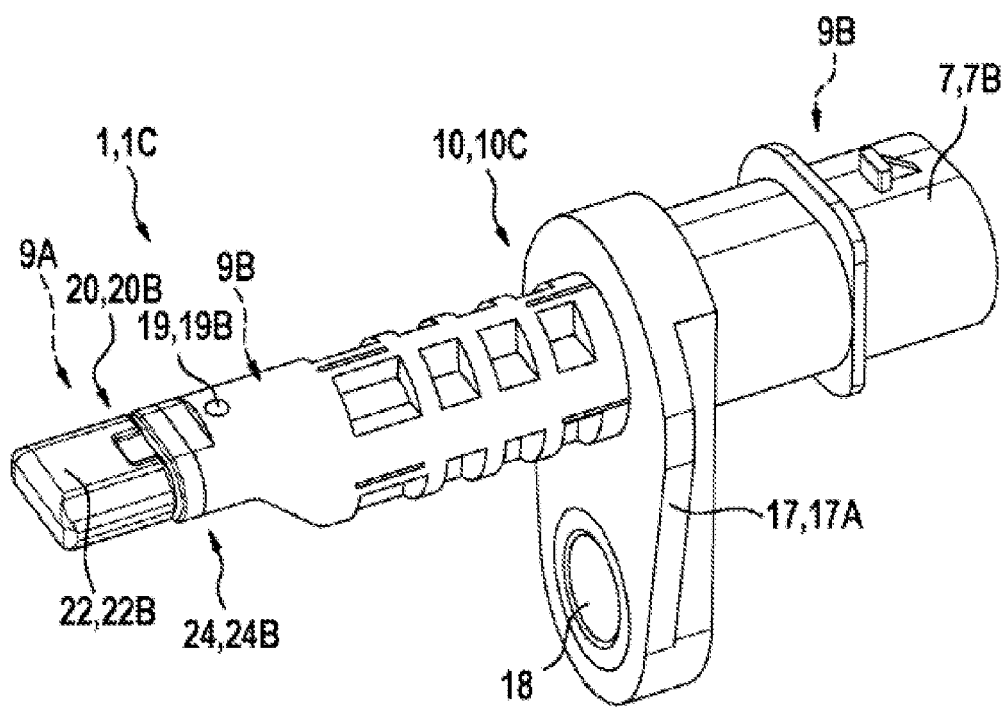

FIG. 5 shows a schematic perspective view of a third exemplary embodiment of a sensor unit according to the disclosure.

Figure 6:
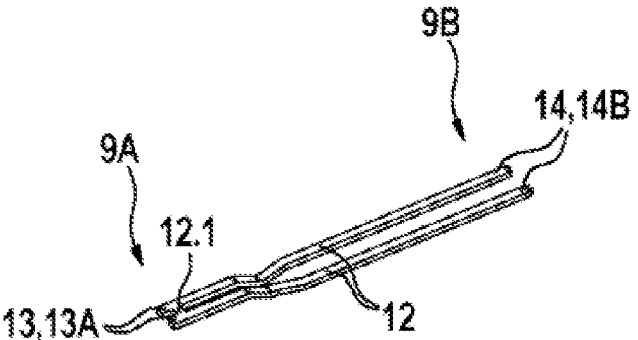

FIG. 6 shows a schematic view of busbars with an internal and an external interface for the sensor unit according to the disclosure of FIG. 5.

Figure 7:
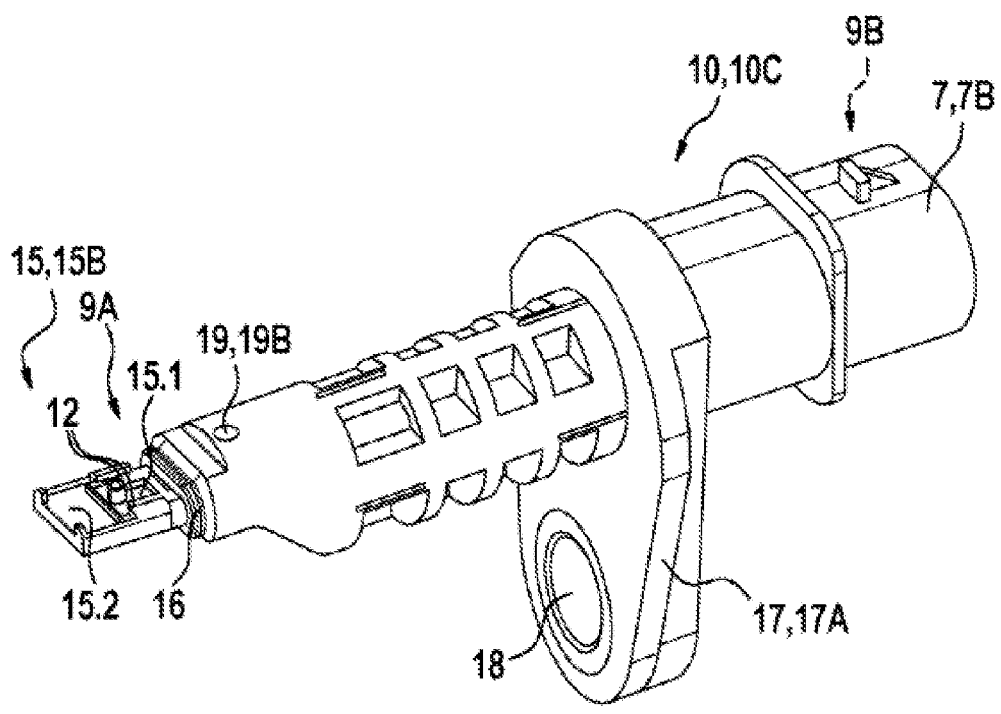

FIG. 7 shows a schematic perspective view of a housing of the sensor unit according to the disclosure of FIG. 5.

Figure 8:
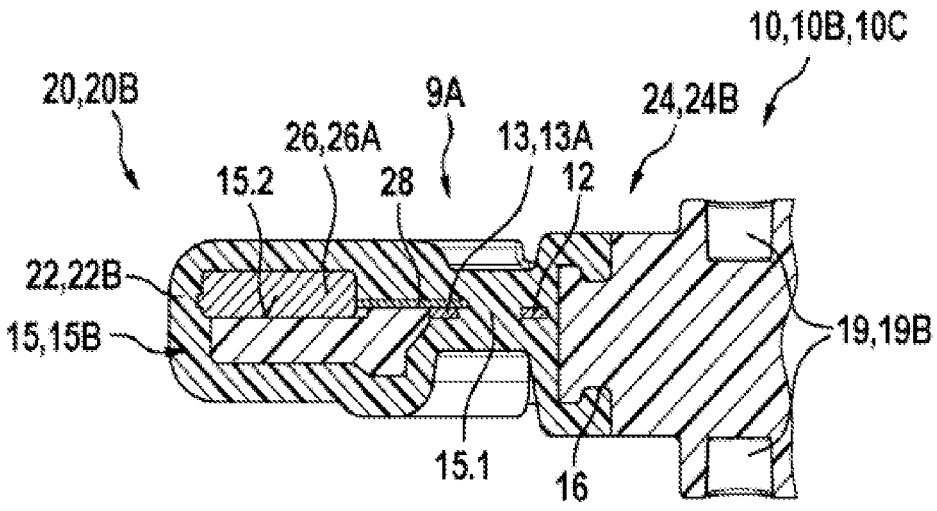

FIG. 8 shows a schematic sectional view of a sensor head of the sensor unit according to the disclosure of FIG. 2 or 5.

Figure 9:
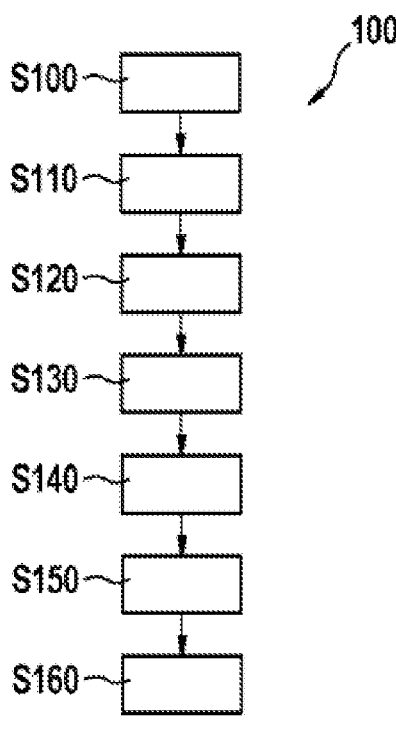

FIG. 9 shows a schematic flow chart of a first exemplary embodiment of a method according to the disclosure for producing the sensor units according to the disclosure of FIG. 1 or 2.

Figure 10:
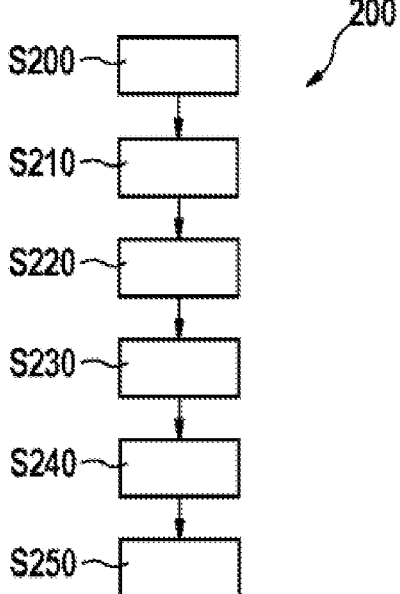

FIG. 10 shows a schematic flow chart of a second exemplary embodiment of a method according to the disclosure for producing the sensor unit according to the disclosure of FIG. 5.

Figure 11:
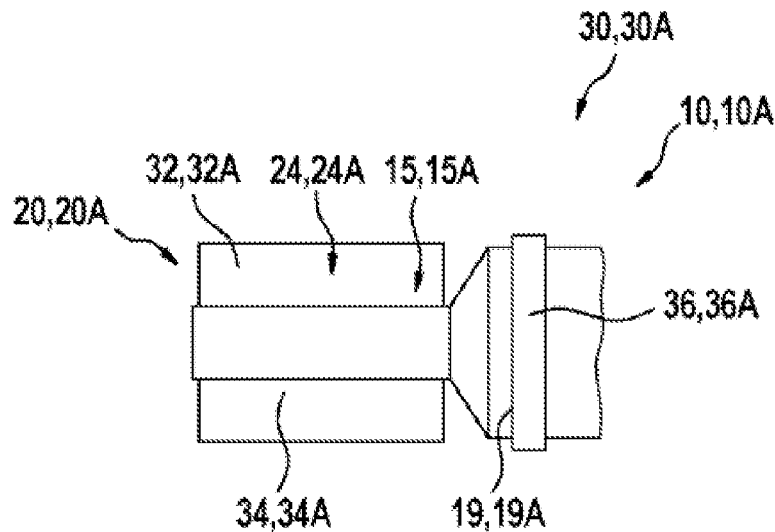

FIG. 11 shows a schematic view of a detail of an injection molding tool for producing the sensor unit according to the disclosure of FIG. 1.

Figure 12:
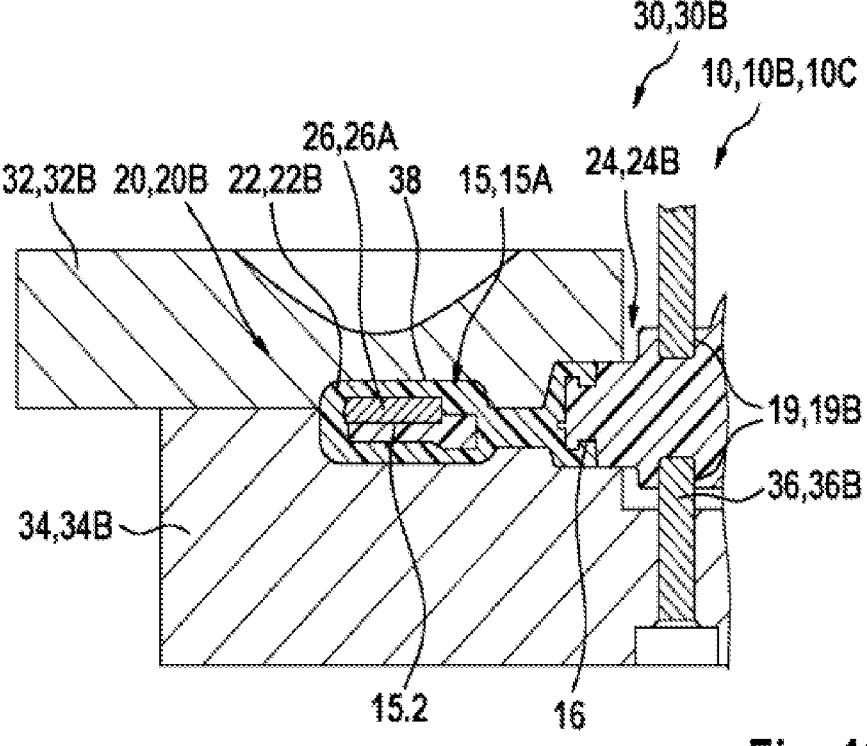

FIG. 12 shows a schematic view of a detail of an injection molding tool for producing the sensor units according to the disclosure of FIG. 2 or 5.

DETAILED DESCRIPTION

As can be seen from FIGS. 1 to 8, the illustrated exemplary embodiments of a sensor unit 1, 1A, 1B, 1C according to the disclosure each comprise at least one sensor 26 and at least two busbars 12. An internal electric interface 9A for contacting the at least one sensor 26 is formed on first ends of the at least two busbars 12. An external electric interface 9B for a connection cable 3 or a plug receiving area 7B is formed on second ends of the at least two busbars 12. An injection-molded housing 10, 10A, 10B, 10C made of a plastic material specifies an outer shape of the sensor unit 1, 1A, 1B, 1C and forms a sensor receiving area 15 with a through-opening 15.1. The housing 10, 10A, 10B, 10C partly encases the at least two busbars 12 such that the internal electric interface 9A is at least partly free and accessible in the region of the sensor receiving area 15, and the external electric interface 9B for the connection cable 3 or the plug receiving area 7B is formed within the housing 10, 10A, 10B, 10C. The at least one sensor 26 is held by the sensor receiving area 15 and contacted with the internal electric interface 9A. In this case, the internal electric interface 9A and the at least one positioned and contacted sensor 26 are surrounded by a potting compound 22 in a media-tight manner and form a sensor head 20, 20A, 20B which is sealed off from the housing 10, 10A, 10B, 10C, wherein the potting compound 22 of the sensor head 20 can be processed at lower pressures and/or temperatures than the plastic material of the housing 10.

In the exemplary embodiments shown, a polybutylene terephthalate (PBT) or a polyamide (PA) is used as the plastic material for the housing 10, 10A, 10B, 10C. A hot melt adhesive or a thermoplastic elastomer (TPE) or a thermoplastic polyurethane (TPU) or a silicone can be used as a potting compound 22, for example. In order to improve the bonding capacity, reactive bonding agents can be mixed into the plastic material for the housing 10, 10A, 10B, 10C and/or into the material of the potting compound 22.

In the illustrated exemplary embodiments, the sensor units 1, 1A, 1B, 1C each comprise a sensor 26, which is designed as a sensor chip 26A and comprises, for example, a Hall effect sensor element or a magnetoresistive sensor element. The sensor units 1, 1A, 1B, 1C are preferably used as speed sensors for sensing rotational movements of a vehicle wheel or a shaft.

As can further be seen from FIGS. 1, 2, 4, 5 and 7, a fastening device 17 is molded onto the housing 10, 10A, 10B, 10C and comprises a fastening tab 17A and a bushing 18 that is integrated into the fastening tab 17A. In order to fasten the sensor unit 1, 1A, 1B, 1C, a screw (not shown) can be passed through the bushing 18, and the sensor unit 1, 1A, 1B, 1C can be screwed in at the installation location, for example to a steering knuckle. In alternative exemplary embodiments of the sensor unit 1 that are not shown, latching means can be molded onto the housing 10 as a fastening device 17 instead of the fastening tab 17A, for example. In these exemplary embodiments, the sensor unit 1 can be inserted and latched into a receiving hole, for example.

As can further be seen from FIG. 1, the sensor receiving area 15 of the shown first embodiment of the sensor unit 1A according to the disclosure, which is formed on a first end of the housing 10A, comprises a receiving tray 15A molded onto the housing 10A. In the region of the internal electric interface 9A, the through-opening 15.1 is introduced into the receiving tray 15A. In this case, the potting compound 22 forms a filling 22A which fills the receiving tray 15A, which is molded onto the housing 10A, and the through-opening 15.1 in a media-tight manner and encases the sensor 26, which is introduced into the receiving tray 15A, and the internal electric interface 9A.

As can further be seen from FIG. 1, the sensor 26 rests in a depression 15.2 of a bottom of the receiving tray 15A. First contact means 13 designed as contact surfaces 13A are provided on first ends of the two busbars 12. Second contact means 14 designed as crimp sleeves 14A are provided on the second ends of the two busbars 12 and are each connected to a stripped end of a wire 5 of a connection cable 3. Both sides of the first ends of the two busbars 12 are accessible through the through-opening 15.1. This facilitates the establishment of electric contacting of the terminal contacts 28 of the sensor 26 with the contact surfaces 13A of the busbars 12, for example by resistance welding or soldering. Of course, other connection techniques can also be used to electrically connect the sensor 26 to the internal interface 9A or to electrically connect the connection cable 3 to the external interface 9B. On a second end of the housing 10A opposite the first end, a connection area 7 is formed, which comprises a cable receiving area 7A for the connection cable 3 in the first exemplary embodiment shown. At the cable receiving area 7A, the connection cable 3 enters the housing 10A. In addition, a circumferential depression 19A is formed as a mounting area 19 on the housing 10A at the transition to the sensor head 20A, at which mounting area the housing 10A is held while the potting compound 22 is introduced into the receiving tray 15A.

As can further be seen from FIGS. 2 and 5, the sensor receiving area 15 of the illustrated second and third exemplary embodiments of the sensor unit 1B, 1C according to the disclosure, which is formed on a first end of the respective housing 10B, 10C, comprises a retaining bar 15B molded onto the housing 10B, 10C. In the region of the internal electric interface 9A, the through-opening 15.1 is introduced into the retaining bar 15B. In this case, the potting compound 22 forms a sheath 22B, which fills the through-opening 15.1 and encases the retaining bar 15B molded onto the housing 10B, 10C, the sensor 26 arranged on the retaining bar 15B, and the internal electric interface 9A in a media-tight manner. As can further be seen from FIG. 8, the sensor 26 rests in a depression 15.2 of the retaining bar 15B.

As can further be seen from FIGS. 3 and 4, first contact means 13 designed as contact surfaces 13A are formed on the first ends of the two busbars 12 in the illustrated second exemplary embodiment of the sensor unit 1B analogously to the first exemplary embodiment. In addition, second contact means 14 designed as crimp sleeves 14A are formed on the second ends of the two busbars 12 and are each connected to a stripped end of a wire 5 of a connection cable 3. Both sides of the first ends of the two busbars 12 are accessible through the through-opening 15.1. This facilitates the establishment of electric contacting of the terminal contacts 28 of the sensor 26 with the contact surfaces 13A of the busbars 12, for example by resistance welding or soldering. Of course, other connection techniques can also be used to electrically connect the sensor 26 to the internal interface 9A or to electrically connect the connection cable 3 to the external interface 9B. Analogously to the first exemplary embodiment, a connection area 7 is formed on the second end of the housing 10B opposite the first end and comprises a cable receiving area 7A for the connection cable 3. At the cable receiving area 7A, the connection cable 3 enters the housing 10B. In addition, two mounting openings 19B are formed as mounting areas 19 on the housing 10B at the transition to the sensor head 20B, at which mounting areas the housing 10B is held during the insert-molding process of the retaining bar 15B with the potting compound 22.

As can further be seen from FIGS. 6 and 7, first contact means 13 designed as contact surfaces 13A are formed on the first ends of the two busbars 12 in the illustrated third exemplary embodiment of the sensor unit 1C analogously to the other exemplary embodiments. In contrast to the other exemplary embodiments, second contact means 14 designed as plug contacts 14B are formed on the second ends of the two busbars 12. In addition, on the second end of the housing 10C opposite the first end, a connection area 7 is formed, which in the illustrated third exemplary embodiment comprises a plug receiving area 7B into which a plug (not shown) can be inserted for connecting the sensor unit 1C. The plug contacts 14B arranged on the second ends of the busbars 12 form the contact elements of the plug receiving area 7B. In an alternative exemplary embodiment of the sensor unit 1C that is not shown, the contact elements of the plug receiving area 7B can be designed as busbars, which can form the plug contacts of the plug receiving area 7B at one end and can be designed, for example, as contact strips at the other end. The contact strips of the contact elements can then be connected to the second contact means 14 of the at least two busbars 12 at the external electric interface 9B of the sensor unit 1C via splice sleeves. In addition, the splice sleeves themselves can form the second contact means 14 of the at least two busbars 12. Of course, other connection techniques, such as resistance welding or soldering, can also be used to electrically connect the contact elements of the plug receiving area 7B, which are designed as busbars, to the external electric interface 9B. Both sides of the first ends of the two busbars 12 are accessible through the through-opening 15.1. This facilitates the establishment of electric contacting of the terminal contacts 28 of the sensor 26 with the contact surfaces 13A of the busbars 12, for example by resistance welding or soldering. Of course, other connection techniques can also be used to electrically connect the sensor 26 to the internal interface 9A. In addition, analogously to the second exemplary embodiment, two mounting openings 19B are formed as mounting areas 19 on the housing 10C at the transition to the sensor head 20B, at which mounting areas the housing 10C is held during the insert-molding process of the retaining bar 15B with the potting compound 22.

As can be seen from FIG. 9, the illustrated first exemplary embodiment of a method 100 for producing a wired sensor unit 1A, 1B comprises a step S100, by which at least two busbars 12 are provided, which are connected to each other via at least one connecting bar 12.1. In step S110, the wires 5 of the connection cable 3 are connected to the second ends of the at least two busbars 12, which form the external interface 9B. In step S120, the busbars 12 together with connection cable 5 are introduced into a cavity of a first injection molding tool, which specifies a shape of the housing 10A, 10B with a sensor receiving area 15 for at least one sensor 26. In step S130, a first injection molding process is performed with a plastic material, and the injection-molded housing 10A, 10B is cured. In step S140, the at least one sensor 26 is inserted and positioned into the sensor receiving area 15 of the housing 10A, 10B, and in step S150, the at least one sensor 26 is then contacted with the internal electric interface 9A of the at least two busbars 12. In step S160, the housing 10A, 10B is introduced into a second injection molding tool 30, 30A, 30B and a second injection molding process is performed with a potting compound 22 in such a way that the potting compound 22 in the cured state surrounds the internal electric interface 9A and the at least one positioned and contacted sensor 26 in a media-tight manner and forms a sensor head 20A, 20B which is sealed off from the housing 10A, 10B. In this case, the potting compound 22 of the sensor head 20A, 20B consists of a material that is introduced into the corresponding injection molding tool 30, 30A, 30B at lower pressures and/or temperatures than the plastic material of the housing 10A, 10B.

As can be seen from FIG. 10, the illustrated second exemplary embodiment of a method 200 for producing a sensor unit 1C with a plug receiving area 7B comprises a step S200, by which at least two busbars 12 are provided, which are connected to each other via at least one connecting bar 12.1 and whose second ends form an external interface 9B and contact elements of the plug receiving area 7B. In step S210, the busbars 12 are introduced into a cavity of a first injection molding tool, which specifies a shape of a housing 10C with the plug receiving area 7B and a sensor receiving area 15 for at least one sensor 26. In step S220, a first injection molding process is performed with a plastic material, and the injection-molded housing 10C is cured. In step S230, the at least one sensor 26 is inserted and positioned into the sensor receiving area 15, and in step S240, the at least one sensor 26 is contacted with the internal electric interface 9A of the at least two busbars 12. In step S250, the housing 10C is introduced into a second injection molding tool 30, 30A, 30B and a second injection molding process is performed in such a way that the potting compound 22 in the cured state surrounds the internal electric interface 9A and the at least one positioned and contacted sensor 26 in a media-tight manner and forms a sensor head 20A, 20B which is sealed off from the housing 10. In this case, the potting compound 22 of the sensor head 20A, 20B consists of a material that is introduced into the corresponding injection molding tool 30, 30A, 30B at lower pressures and/or temperatures than the plastic material of the housing 10C.

The busbars 12 are preferably produced as stamped bent parts. In this case, a plurality of busbars 12 can be provided in the form of stamped grids from a roll or as individual stamped grid sheets.

When the contact elements of the plug receiving area 7B are designed as busbars, they are connected to the second ends of the at least two busbars 12, which form the external interface 9B, when the sensor unit 1 is produced with the first exemplary embodiment of the method 100 according to the disclosure in step S110. In step S120, the busbars 12 together with the contact elements of the plug receiving area 7B are then introduced into a cavity of a first injection molding tool, which specifies a shape of the housing 10 with a sensor receiving area 15 for at least one sensor 26 and with the plug receiving area 7B. Alternatively, when the contact elements of the plug receiving area 7B are designed as busbars, they can be connected to the second contact means 14 of the external interface 9B of the at least two busbars 12 when the sensor unit 1 is produced with the second exemplary embodiment of the method 200 according to the disclosure in an additional contacting step (not shown) before performing the method step S210, before they are introduced into the first injection molding tool in step S210 and the first injection molding process for producing the housing 10 of the sensor unit 1 is performed in step S220.

Furthermore, the at least one connecting bar 12.1 between the at least two busbars 12 is cut prior to the second injection molding process in step S160 of the method 100 or in step S250 of the method 200.

For exemplary embodiments of the sensor unit 1 with a receiving tray 15A, such as the first exemplary embodiment of the sensor unit 1A shown in FIG. 1, the potting compound 22 forms a filling 22A after step S160, which filling, in the cured state, fills the receiving tray 15A of the sensor receiving area 15 and the through-opening 15.1. surrounds the at least one sensor 26 and the internal electric interface 9A in a media-tight manner, and is connected to the housing 10 in a media-tight manner. In an exemplary embodiment not shown, the sensor unit 1 comprises a receiving tray 15A and a plug receiving area 7B and is produced using the method 200. After step S250, the potting compound 22 therefore also forms a filling 22A, which, in the cured state, fills the receiving tray 15A of the sensor receiving area 15 and the through-opening 15.1, surrounds the at least one sensor 26 and the internal electric interface 9A in a media-tight manner, and is connected to the housing 10 in a media-tight manner.

For the exemplary embodiments of the sensor unit 1B, 1C shown in FIGS. 2 and 5, the potting compound 22 forms a sheath 22B, which, in the cured state, surrounds a retaining bar 15B of the sensor receiving area 15 with the at least one sensor 26 and the internal electric interface 9A, fills the through-opening 15.1, and is connected to the housing 10B, 10C in a media-tight manner.

Optionally, after curing the housing 10A, 10B, 10C in step S130 of the first method 100 or in step S220 of the second method 200, an additional method step is provided, in which at least one sealing area 24, 24A, 24B at contact areas of housing 10A, 10B, 10C is pre-treated with the potting compound 22 prior to introducing the housing 10A, 10B, 10C into the second injection molding tool 30, 30A, 30B, in order to increase a connection between the housing 10A, 10B, 10C and the potting compound 22.

In the first exemplary embodiment of the sensor unit 1A, the at least one sealing area 24 corresponds to a wall 24A of the receiving tray and an edge of the through-opening 15.1. In the second and third exemplary embodiments of the sensor units 1B, 1C, the at least one sealing area 24 corresponds to an overlapping area 24B, at which the sheath 22B overlaps the housing 10B, 10C and at which a sealing contour 16 with an undercut is formed on the housing 10B, 10C in the illustrated exemplary embodiment.

In the optional method step, the at least one sealing area 24 of the housing 10A, 10B, 10C can be polished and/or roughened and/or specifically structured. Additionally or alternatively, the at least one sealing area 24 of the housing 10A, 10B, 10C can be plasma-cleaned and/or plasma-activated. Furthermore, the at least one sealing area 24 of the housing 10 can be coated with an adhesion agent or primer. Of course, any combination of the measures can also be performed in order to achieve an optimal connection between the housing 10A, 10B, 10C and the potting compound 22.

As can be seen from FIGS. 11 and 12, the illustrated exemplary embodiments of the second injection molding tool 30, 30A, 30B each comprise a first mold part 32, 32A, 32B that is shown at the top in the illustration, a second mold part 34, 34A, 34B that is shown at the bottom in the illustration, and a mounting device 36 which holds the housing 10A, 10B, 10C during the second injection molding process.

As can further be seen from FIG. 11, in the illustrated first exemplary embodiment of the second injection molding tool 30A, the mounting device 36 comprises retaining jaws 36A which engage in the mounting area 19 of the housing 10A of the sensor unit 1A shown in FIG. 1, which mounting area is formed as a circumferential depression 19A. As can further be seen from FIG. 11, the two tool parts 32A, 34A are designed very simply and only cover the receiving tray 15A and the through-opening 15.1 of the sensor receiving area 15, wherein at least within one of the two tool parts 32A, 34A, channels (not shown) are formed, through which the liquid potting compound 22 can be injected.

As can further be seen from FIG. 12, in the illustrated second exemplary embodiment of the second injection molding tool 30B, the two tool parts 32B, 34B form a cavity 38, which specifies the outer shape of the insert-molded sheath 22B. In addition, in the illustrated second exemplary embodiment, the mounting device 36 comprises two retaining pistons 36B, which retract into the mounting openings 19B of the mounting area 19 of the housings 10B, 10C of the sensor units 1B, 1C shown in FIGS. 2 and 5. At least within one of the two tool parts 32B, 34B, channels (not shown) are formed, through which the liquid potting compound 22 can be injected into the cavity 38.

The invention claimed is:

1. A sensor unit comprising:
   at least one sensor;
   at least two busbars, each of which has a first end and a second end, the first ends having an internal electric interface that contacts the at least one sensor and the second ends having an external electric interface configured for a connection cable or a plug receiving area;
   an injection-molded housing made of a plastic material that defines an outer shape of the sensor unit and forms a sensor receiving area configured to support the at least one sensor and defining a through-opening through the housing in said sensor receiving area, the housing partly encasing the at least two busbars such that the internal electric interface is at least partly free and accessible in a region of the sensor receiving area and the external electric interface is formed within the housing,
   wherein the at least one sensor is supported by the sensor receiving area and is contacted with the internal electric interface,
   wherein the internal electric interface and the at least one sensor are surrounded in a media-tight manner by a potting compound and form a sensor head which is sealed off from the housing,
   wherein the potting compound fills the through-opening, and
   wherein the potting compound of the sensor head is formed of a material that is processed at lower pressures and/or temperatures than the plastic material of the housing.

2. The sensor unit according to claim 1, wherein the sensor receiving area comprises a receiving tray which is molded onto the housing and into which the through-opening is introduced in a region of the internal electric interface.

3. The sensor unit according to claim 2, wherein the potting compound forms a filling which fills the receiving tray and the through-opening in a media-tight manner and encases the at least one sensor, which is introduced into the receiving tray, and the internal electric interface.

4. The sensor unit according to claim 1, wherein the sensor receiving area comprises a retaining bar, which is molded onto the housing and into which the through-opening is introduced in a region of the internal electric interface.

5. The sensor unit according to claim 4, wherein the potting compound forms a sheath, which fills the through-opening and encases the retaining bar, the at least one sensor, and the internal electric interface in a media-tight manner.

6. The sensor unit according to claim 1, wherein a first contact arrangement configured as first contact surfaces are formed on the first ends of the at least two busbars.

7. The sensor unit according to claim 1, wherein a second contact arrangement configured as second contact surfaces, crimp sleeves plug contacts, or contact strips are formed on the second ends of the at least two busbars.

8. The sensor unit according to claim 1, wherein a fastening device is molded onto the housing and comprises a fastening tab or latching arrangement.

9. The sensor unit according to claim 1, wherein the plastic material of the housing is a polybutylene terephthalate (PBT) or a polyamide (PA), and the potting compound is one of a hot melt adhesive, a thermoplastic elastomer (TPE), a thermoplastic polyurethane (TPU), and a silicone.

10. A method for producing a sensor unit, comprising:

connecting wires of a connection cable, or contact elements of a plug receiving area to second ends of at least two busbars, which are connected to each other via at least one connecting bar, so as to form an external electric interface;

introducing the at least two busbars, with the connection cable or the contact elements of the plug receiving area, into a cavity of a first injection molding tool which specifies a shape of a housing with a sensor receiving area configured to support at least one sensor and defining a through-opening through the housing in said sensor receiving area;

performing a first injection molding process with a plastic material and curing the plastic material to form the housing, the external electric interface being arranged within the housing;

inserting and positioning the at least one sensor on the sensor receiving area of the housing and contacting the at least one sensor with an internal electric interface of the at least two busbars that is formed at respective first ends of the at least two busbars, the internal electric interface being at least partly free and accessible in a region of the sensor receiving area;

introducing the housing into a second injection molding tool; and performing a second injection molding process with a potting compound in such a way that the potting compound, in a cured state, fills the through-opening and surrounds the internal electric interface and the at least one sensor in a media-tight manner to form a sensor head which is sealed off from the housing, wherein the potting compound of the sensor head is formed of a material which is introduced into the corresponding injection molding tool at lower pressures and/or temperatures than the plastic material of the housing.

11. The method according to claim 10, further comprising:

cutting the at least one connecting bar between the at least two busbars prior to the second injection molding process.

12. The method according to claim 10, wherein the potting compound forms a filling, which in the cured state fills a receiving tray of the sensor receiving area and the through-opening, surrounds the at least one sensor and the internal electric interface in a media-tight manner, and is connected to the housing in a media-tight manner.

13. The method according to claim 10, wherein the potting compound forms a sheath, which in the cured state surrounds a retaining bar of the sensor receiving area with the at least one sensor and the internal electric interface, fills the through-opening, and is connected to the housing in a media-tight manner.

14. The method according to claim 10, further comprising:

pre-treating at least one sealing area at contact areas of the housing with the potting compound prior to introducing the housing into the second injection molding tool, in order to increase a connection between the housing and the potting compound.

15. A method for producing a sensor unit, comprising:

introducing at least two busbars, which are connected to each other via at least one connecting bar and which have second ends that form an external interface and contact elements for a plug receiving area, into a cavity of a first injection molding tool which specifies a shape of a housing with the plug receiving area and a sensor receiving area fer configured to support at least one sensor and defining a through-opening through the housing in said sensor receiving area;

performing a first injection molding process with a plastic material and curing the plastic material to form the housing, the external electric interface being arranged within the housing;

inserting and positioning the at least one sensor into the sensor receiving area and contacting the at least one sensor with an internal electric interface of the at least two busbars that is formed at respective first ends of the at least two busbars, the internal electric interface being at least partly free and accessible in a region of the sensor receiving area;

introducing the housing into a second injection molding tool; and performing a second injection molding process with a potting compound in such a way that the potting compound in a cured state, fills the through-opening and surrounds the internal electric interface and the at least one sensor in a media-tight manner to form a sensor head which is sealed off from the housing, wherein the potting compound of the sensor head is formed of a material which is introduced into the corresponding injection molding tool at lower pressures and/or temperatures than the plastic material of the housing.

* * * * *